US011445042B2

(12) United States Patent
Kwatra et al.

(10) Patent No.: US 11,445,042 B2
(45) Date of Patent: Sep. 13, 2022

(54) CORRELATING MULTIPLE MEDIA SOURCES FOR PERSONALIZED MEDIA CONTENT

(71) Applicant: INTERNATIONAL BUSINESS MACHINES CORPORATION, Armonk, NY (US)

(72) Inventors: Shikhar Kwatra, San Jose, CA (US); Indervir Singh Banipal, Austin, TX (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/247,158

(22) Filed: Dec. 2, 2020

(65) Prior Publication Data

US 2022/0174124 A1     Jun. 2, 2022

(51) Int. Cl.
| | | |
|---|---|---|
| *H04L 67/306* | (2022.01) | |
| *G06N 20/00* | (2019.01) | |
| *G06N 5/04* | (2006.01) | |
| *H04L 67/50* | (2022.01) | |

(52) U.S. Cl.
CPC ............. *H04L 67/535* (2022.05); *G06N 5/04* (2013.01); *G06N 20/00* (2019.01); *H04L 67/306* (2013.01)

(58) Field of Classification Search
CPC ....... H04L 67/22; H04L 67/306; G06N 20/00; G06N 5/04
See application file for complete search history.

(56) References Cited

U.S. PATENT DOCUMENTS

| | | | |
|---|---|---|---|
| 6,460,036 B1 | 10/2002 | Herz | |
| 7,925,708 B2 | 4/2011 | Davis | |
| 7,991,770 B2 | 8/2011 | Covell | |
| 9,268,770 B1 | 2/2016 | Kursun | |
| 10,187,677 B1 | 1/2019 | Panchaksharaiah | |
| 10,285,001 B2 | 5/2019 | Allen | |
| 10,324,935 B1 | 6/2019 | Patton | |
| 2009/0292771 A1* | 11/2009 | Bertoni | H04L 67/26 709/204 |

(Continued)

OTHER PUBLICATIONS

Anonymous, "U.S. Newspaper Market Size, Share & Trends Analysis (2018-2025) by Revenue Generation—ResearchAndMarkets.com," Businesswire.com, Oct. 31, 2018 [accessed on Jun. 11, 2020], 2 pages, Retrieved from the Internet: <URL: https://www.businesswire.com/news/home/20181031005333/en/U.S.-Newspaper-Market-Size-Share-Trends-Analysis>.

(Continued)

*Primary Examiner* — Soe Hlaing
(74) *Attorney, Agent, or Firm* — Elliot J. Shine

(57) ABSTRACT

A method, computer system, and a computer program product for personalized content is provided. The present invention may include monitoring media content from one or more platforms based on user preferences. The present invention may include identifying related media content from the one or more platforms. The present invention may include determining one or more pairs of related media content based on a confidence score. The present invention may include assembling the one or more pairs of related media content based on rules of a media content engine. The present invention may include generating personalized media content.

18 Claims, 5 Drawing Sheets

(56) References Cited

U.S. PATENT DOCUMENTS

| | | | | |
|---|---|---|---|---|
| 2013/0179783 | A1* | 7/2013 | Woods | H04N 21/42209 715/716 |
| 2016/0098477 | A1* | 4/2016 | Berajawala | G06F 3/0482 707/727 |
| 2016/0269352 | A1* | 9/2016 | Cashmore | G06F 40/194 |
| 2017/0103069 | A1* | 4/2017 | Brennan | G06F 16/2455 |
| 2020/0110835 | A1* | 4/2020 | Zhao | G06N 5/022 |
| 2020/0193056 | A1* | 6/2020 | Hughes | G06F 16/38 |
| 2021/0097191 | A1* | 4/2021 | Howell | G06F 21/6218 |
| 2021/0158296 | A1* | 5/2021 | Cathey | G06N 3/0454 |

OTHER PUBLICATIONS

He, et al., "Discovering Canonical Correlations Between Topical and Topological Information in Documents Networks," CIKM '15: Proceedings of the 24th ACM International on Conference on Information and Knowledge Management, Oct. 2015, pp. 1281-1290, Retrieved from the Internet: <URL: https://doi.org/10.1145/2806416.2806518>.

Marketsandmarkets, "Big Data and Data Engineering Services Market Worth $77.37 Billion By 2023," PRNewswire.com, Sep. 4, 2018 [accessed on Jun. 11, 2020], 5 pages, Retrieved from the internet: <URL:https://www.prnewswire.com/news-releases/big-data-and-data-engineering-services-market-worth-77-37-billion-by-2023-855249190.html>.

Mell, et al., "The NIST Definition of Cloud Computing", National Institute of Standards and Technology, Special Publication 800-145, Sep. 2011, 7 pages.

Transparency Market Research, "Television Broadcast Services Market to be Worth US$755.7 Bn by 2026: Transparency Market Research," PRNewswire.com, May 30, 2018 [accessed on Jun. 11, 2020], 8 pages, Retrieved from the Internet: <URL: https://www.prnewswire.com/news-releases/television-broadcasting-services-market-to-be-worth-us-7557-bn-by-2026-transparency-market-research-684029061.html>.

* cited by examiner

CORRELATING MULTIPLE MEDIA SOURCES FOR PERSONALIZED MEDIA CONTENT

BACKGROUND

The present invention relates generally to the field of computing, and more particularly to personalized media content.

A media platform may be a service, website, or method that delivers media content to an audience. A media platform may also allow for feedback, discussion, or sharing. The media content may be delivered in different forms including, but not limited to, video, audio, recorded audio, recorded telephonic conversations, text, Graphics Interchange Format (GIFs), Multiple Entry Multiple Exit (Memes), live video, live audio, live chat, newsletters, interviews, eBooks, podcasts, Public Service Announcements (PSA), portable document format (PDF). In different situations, media content from one or more media platforms may be correlated and/or causal, and media content presented on one platform combined with media content on a different platform may provide a consumer a more holistic view of a situation.

Furthermore, the consumer may be tasked with recognizing a connection between the current situation and a past situation in order to predict an outcome.

SUMMARY

Embodiments of the present invention disclose a method, computer system, and a computer program product for personalized content. The present invention may include monitoring media content from one or more platforms based on user preferences. The present invention may include identifying related media content from the one or more platforms. The present invention may include determining one or more pairs of related media content based on a confidence score. The present invention may include assembling the one or more pairs of related media content based on rules of a media content engine. The present invention may include generating personalized media content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
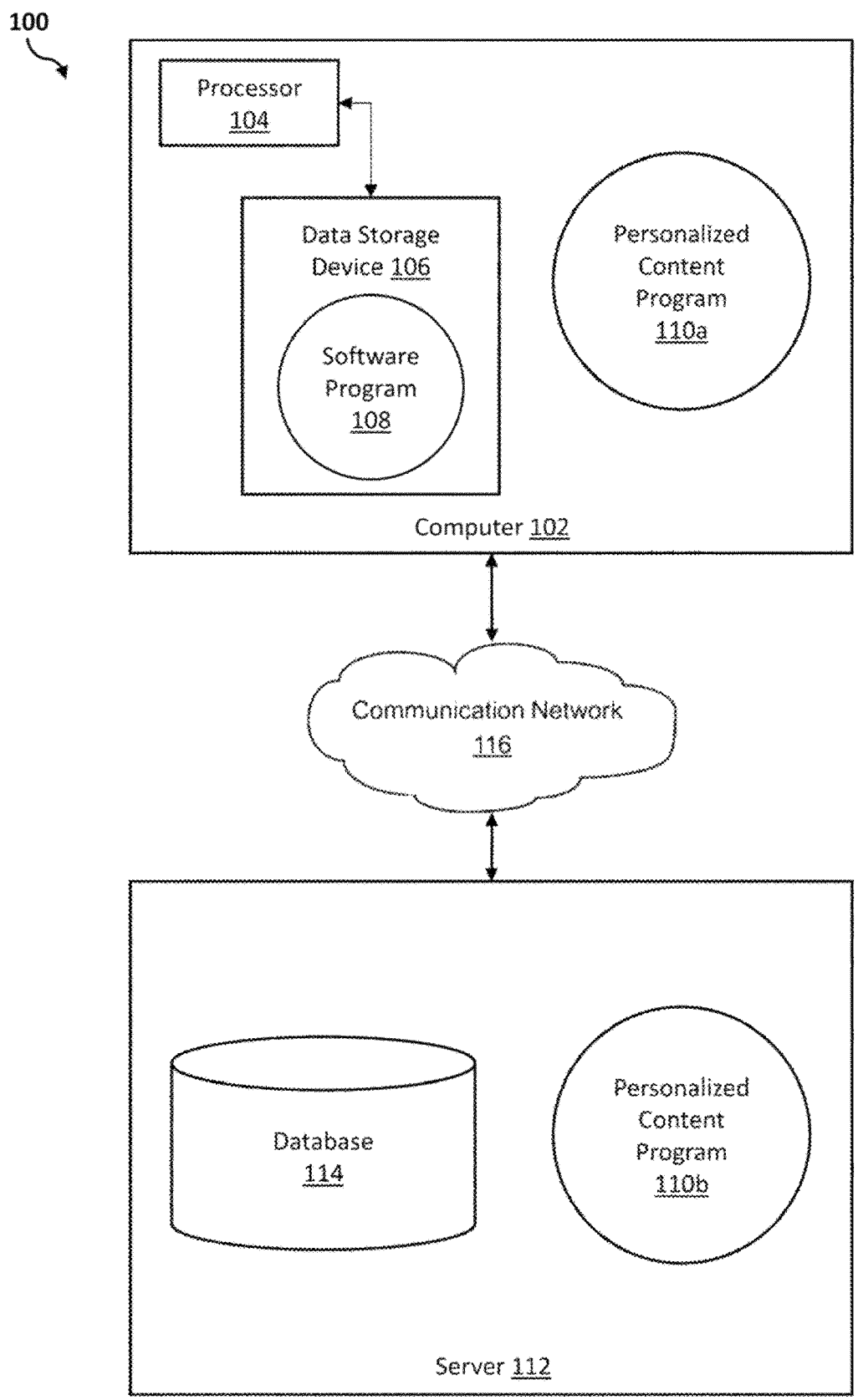
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for personalized content. As such, the present embodiment has the capacity to improve the technical field of personalized media content by generating user specific media content assembled from one or more platforms based on user preferences. More specifically, the present invention may include monitoring media content from one or more platforms based on user preferences. The present invention may include identifying related media content from the one or more platforms. The present invention may include determining one or more pairs of related media content based on a confidence score. The present invention may include assembling the one or more pairs of related media content based on rules of a media content engine. The present invention may include generating personalized media content.

As described previously, a media platform may be a service, website, or method that delivers media content to an audience. A media platform may also allow for feedback, discussion, or sharing. The media content may be delivered in different forms including, but not limited to, video, audio, recorded audio, recorded telephonic conversations, text, Graphics Interchange Format (GIFs), Multiple Entry Multiple Exit (Memes), live video, live audio, live chat, newsletters, interviews, eBooks, podcasts, Public Service Announcements (PSA), portable document format (PDF). In different situations, media content from one or more media platforms may be correlated and/or causal, and media content presented on one platform combined with media content on a different platform may provide a consumer a more holistic view of a situation.

Furthermore, the consumer may be tasked with recognizing a connection between the current situation and a past situation in order to predict an outcome.

Therefore, it may be advantageous to, among other things, monitor media content form one or more platforms based on user preferences, identify related media content from the one or more platforms, determine one or more pairs of related media content based on a confidence score, assemble the one or more pairs of related media content based on rules of a media content engine, and generate personalized media content.

According to at least one embodiment, the present invention may improve personalized media content by monitoring media content from one or more platforms based on user preferences.

According to at least one embodiment, the present invention may improve the effectiveness of identifying related media content on one or more platforms by receiving user feedback based on the personalized media content and training a machine learning model based on the user feedback.

According to at least one embodiment, the present invention may improve the assembling one or more pairs of related media content by utilizing a confidence score.

According to at least one embodiment, the present invention may improve the delivery of context in personalized media content by comprising a sequence of one or more pairs of related media content interspliced based on the confidence score. And may improve the confidence score determination by adjusting the confidence score based on a personality profile of the individuals involved in the personalized media content.

According to at least one embodiment, the present invention may improve the recognition of the personalized media content on the user by providing the user with additional media content based on a determined emotional reaction of the user to the personalized media content. The invention may determine the emotional reaction based on the content that comprises the personalized media content in conjunction with the user preferences.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a personalized content program 110a. The networked computer environment 100 may also include a server 112 that is enabled to run a personalized content program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the personalized content program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the personalized content program 110a, 110b (respectively) to generate personalized media content specific to a user. The personalized content method is explained in more detail below with respect to FIG. 2.

Figure 2:
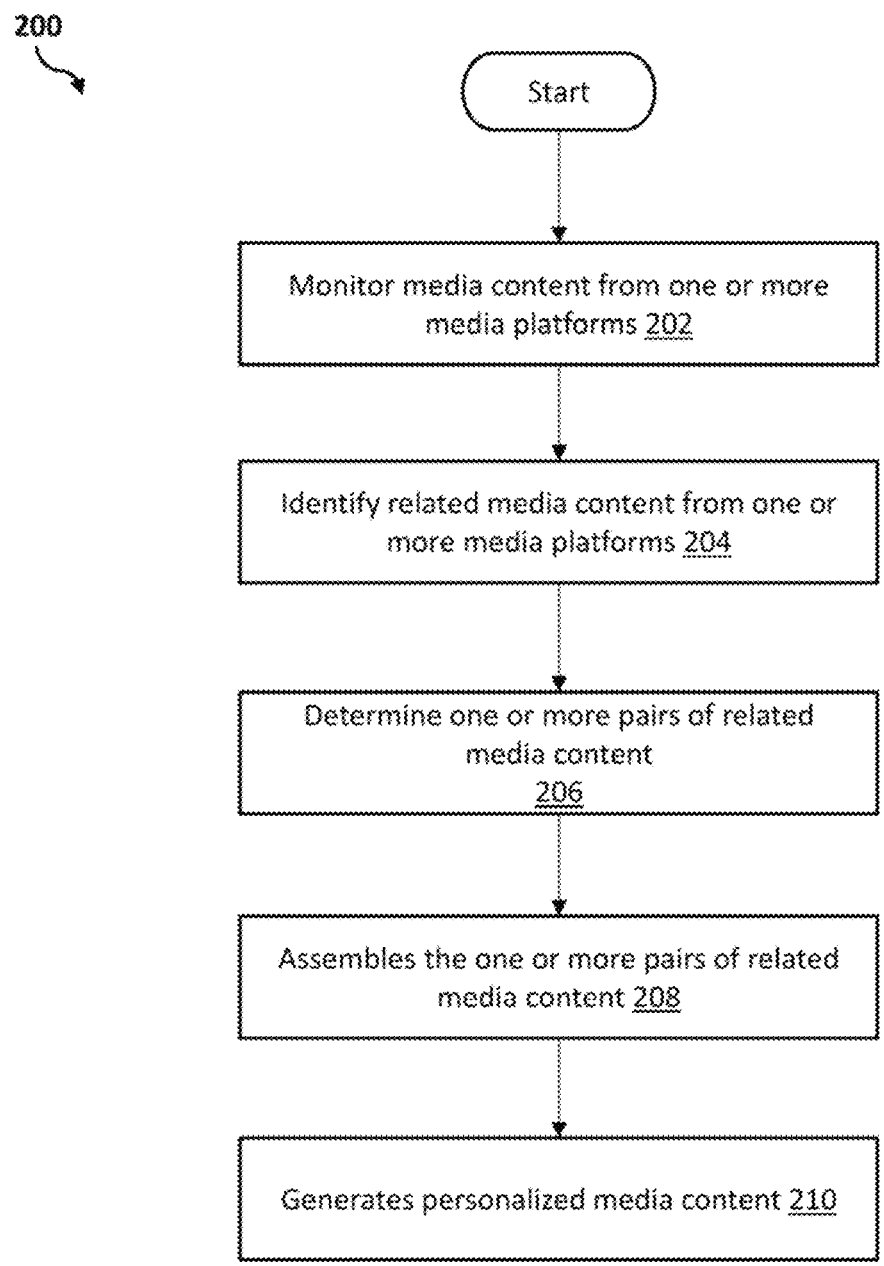
FIG. 2 is an operational flowchart illustrating a process for personalized content according to at least one embodiment.

Referring now to FIG. 2, an operational flowchart illustrating the exemplary personalized content process 200 used by the personalized content program 110a and 110b (hereinafter personalized content program 110) according to at least one embodiment is depicted.

At 202, the personalized content program 110 monitors media content from one or more media platforms. The personalized content program 110 may monitor media content from one or more media platforms based on user preferences. User preferences may be manually selected by a user. User preferences may be determined based on analyzing media content consumed by the user. Media content consumed by the user may be analyzed by the personalized content program 110 and stored in a personal knowledge corpus.

A media platform may be a service, website, or method that delivers media to an audience. A media platform may also allow for feedback, discussion, or sharing. Examples of a media platform may include, but are not limited to including, Facebook® (Facebook is a registered trademark of Facebook, Inc. in the United States and/or other countries) Twitter® (Twitter is a registered trademark of Twitter. Inc. in the United States and/or other countries), Instagram® (Instagram is a registered trademark of Instagram. LLC in the United States and/or other countries), YouTube® (YouTube is a registered trademark of Google, LLC in the United States and/or other countries), among others.

Media content may be available in different forms including, but is not limited to including, video, audio, recorded audio, recorded telephonic conversations, text, Graphics Interchange Format (GIFs), Multiple Entry Multiple Exit (Memes), live video, live audio, live chat, newsletters, interviews, eBooks, podcasts, Public Service Announcements (PSA), portable document format (PDF).

At 204, the personalized content program 110 identifies related media content from the one or more media platforms. The personalized content program 110 may utilize one or more contextual tools to analyze different forms of media content. Contextual tools may include, but are not limited to including, metadata, natural language processing (NLP), a recurrent neural network (RNN), a convolutional neural network (CNN), and long short-term memory module.

The personalized content program 110 may utilize metadata to identify related media content from one or more platforms. Metadata may include, but is not limited to including, author, title, keywords, abstract, time stamps, data created, date modified, tag metadata (e.g., hashtags, official tag, triple tags, knowledge tags), descriptive metadata, structural metadata, administrative metadata, reference metadata, statistical metadata.

The personalized content program 110 may utilize a natural language processing (NLP) statistical model in in understanding the different forms of media content. The personalized content program 110 may utilize a Latent Dirichlet Allocation (LDA) NLP statistical model. The LDA NLP statistical model may identify related media content from one or more platforms.

The personalized content program 110 may further utilize NLP to determine a degree in which analyzed media content is related. NLP may include, but is not limited to including, GloVe, tokenization, stemming, Mel-frequency cepstrum, lemmatization, N-Grams, TF-IDF, and word embedding. Word embedding may include a set of language modeling feature learning techniques within NLP wherein words or phrases may be mapped to vectors of real numbers. Word vectors may be vectors of numbers that represent the meaning of a word.

The word vectors may be converted to a numerical format and the personalized content program 110 may utilize NLP with cosine similarity in identifying the related media content from one or more platforms. The personalized content program 110 may utilize the cosine similarity in determining the confidence score.

The personalized content program 110 may utilize a recurrent neural network (RNN) such as a long short-term memory (LS™) module working in conjunction with NLP for analyzing text and audio media content from one or more platforms.

The personalized content program 110 may utilize convolutional neural network (CNN) LS™ architecture and dense-captioning events for analyzing visual content from one or more platforms. The utilization of CNN-LS™ architecture and dense captioning may enable the personalized content program 110 to perform activity recognition (e.g., generating a textual description of an activity demonstrated in a sequence of images, image description (e.g., generating a textual description of a single image), and video description (e.g., generating a textual description of a sequence of images).

The personalized content program 110 may utilize the textual description of visual content to determine word vectors for the visual content. The personalized content program 110 may convert the word vectors for the visual content to a numerical format. The personalized content program 110 may determine related media content in different forms using cosine similarity.

The personalized content program 110 may further filter related media content based on user interactions with the identified related media content. User interactions may include, but are not limited to including, trending posts, likes, shares, views, comments. The personalized content program 110 may identify related media content by using metadata such as a hashtag for one piece of content and CNN-LTSM activity recognition for another piece of content. The personalized content program 110 may additionally utilize Watson™ personality insights to boost the confidence score between the related media content.

At 206, the personalized content program 110 determined one or more pairs of related media content. The personalized content program 110 may determine one or more pairs of related media content based on the contextual tools. The personalized content program 110 determine a confidence score for the pairs of related media content from one or more platforms. Pairs of related media content may include, but are not limited to including, questions and answers, statements and reactions, events and reactions, commentary on a statement or event, amongst others. The confidence score may represent a level of certainty as to whether the related media content is a pair.

The confidence score may be determined based on at least the cosine similarity of the related media content as well as the metadata. For example, the personalized content program 110 may determine a high cosine similarity between a play in a live sporting event and a reaction posted on Twitter®. Utilizing the time stamps of the play in the live sporting event and the reaction the personalized content program 110 may determine the reaction was posted seconds after the play in the live sporting event. The personalized content program 110 may assign a high confidence score to this pair of related media content.

The personalized content program 110 may utilize a machine learning model to improve the determination of the confidence score between the pairs of related media content. The machine learning model may improve the confidence score determination based on user feedback.

The personalized content program 110 may adjust the confidence score based on a personality profile. The personalized content program 110 may utilize Watson™ personality insights (Watson and all Watson-based trademarks are trademarks or registered trademarks of International Business Machines Corporation in the United States, and/or other countries) to build a personality profile for individuals frequently identified in related media content from one or more platforms. The personalized content 110 may utilize the personality profile to analyze whether the determined pair or related media content is consistent with the personality profile of the individual.

The personalized content program 110 may store personality profile of individuals frequently associated with the user in a personal knowledge corpus as well as general knowledge corpus (e.g., shared database).

For example, the personalized content program 110 may adjust the confidence score up for a determined pair of related media content from one or more platforms if an individual's answer to a question is consistent with the individual's personality profile.

At 208, the personalized content program 110 assembles the one or more pairs of related media content. The personalized content program 110 may assemble the one or more pairs of related media content by intersplicing. The personalized content program 110 may assemble the one or more pairs of related media content by intersplicing based on the confidence score.

The personalized content program 110 may intersplice the one or more pairs of related media content based on rules of a media content engine.

The rules of the media content engine may determine how different forms of media are to be interspliced. Different forms of media include, but are not limited to including, video, audio, recorded audio, recorded telephonic conversations, text, Graphics Interchange Format (GIFs), Multiple Entry Multiple Exit (Memes), live video, live audio, live chat, newsletters, interviews, eBooks, podcasts, Public Service Announcements (PSA), portable document format (PDF). For example, the rules of the media content engine may determine that audio is to be interspliced in an audio layer and text is to be interspliced in a caption layer (e.g., subtitles).

The rules of the media content engine have defined content boundaries. Defined content boundaries may include for example time boundaries (e.g., 6 P.M. to 8 P.M.). Defined content boundaries may exclude related media content that is dated or misleading.

For example, the personalized content program 110 may intersplice one answer to a question over another because of the defined content boundaries.

At 210, the personalized content program 110 generates personalized media content. The personalized media content may be comprised of a sequence of the one or more pairs of related media content. The personalized content program 110 may receive user feedback based on the personalized media content.

The personalized content program 110 may receive user feedback by presenting the user with a prompt. The prompt may allow a user to provide feedback with respect to the relevancy of the interspliced media content.

The personalized content program 110 may provide user feedback to the machine learning model. The machine learning model may utilize the user feedback to improve the determination of the confidence score between pairs of related media content.

The personalized content program 110 may provide the user with additional media content based on a determined emotional reaction of the user to the personalized media content. The determined emotional reaction of the user may be based on the personalized media content in conjunction with the user preferences. The personalized content program 110 may provide the user with additional media content related to the sequence of the personalized media content based on past sequences.

For example, personalized content program 110 may generate personalized media content for the user at halftime of a sporting event. The personalized content program 110 understands the user is a fan of Team B. Team B may be currently losing to Team A. The personalized content program 110 may understand the personalized media content will have a negative emotional reaction from the user. The personalized content program 110 may provide the user with additional media content in which Team B made a comeback in the second half.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
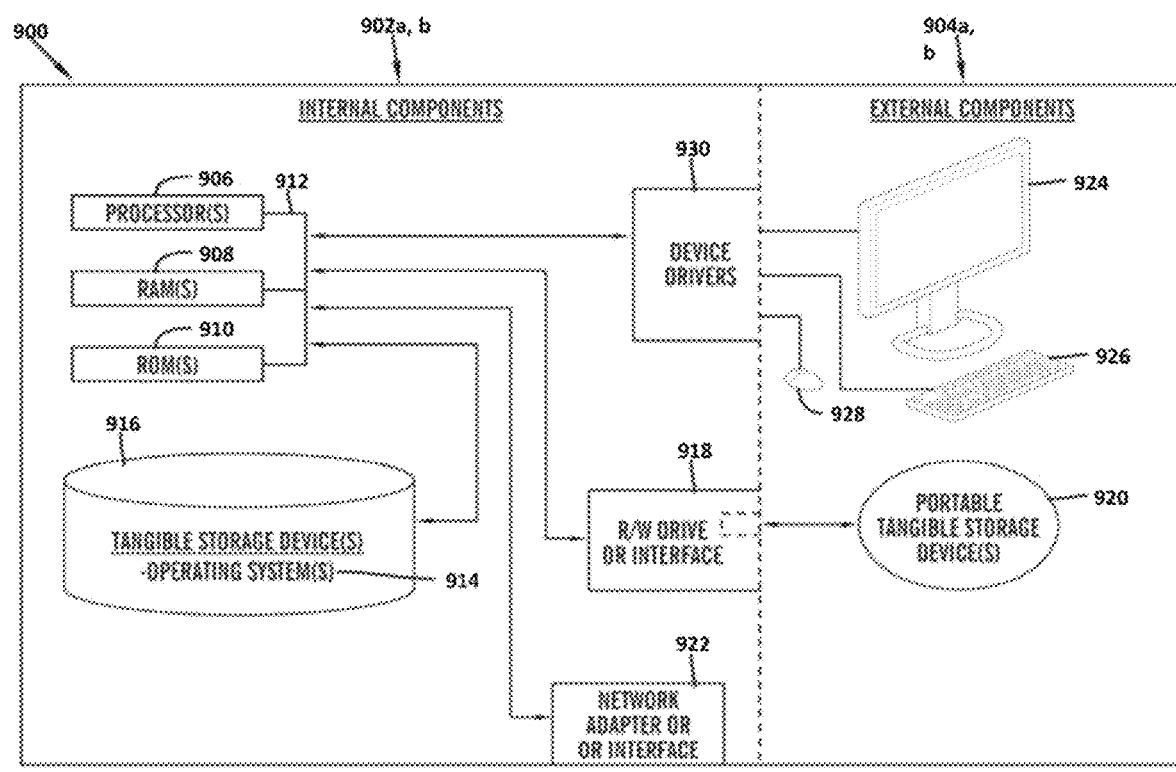
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the personalized content program 110a in client computer 102, and the personalized content program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the personalized content program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the personalized content program 110a in client computer 102 and the personalized content program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the personalized content program 110a in client computer 102 and the personalized content program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
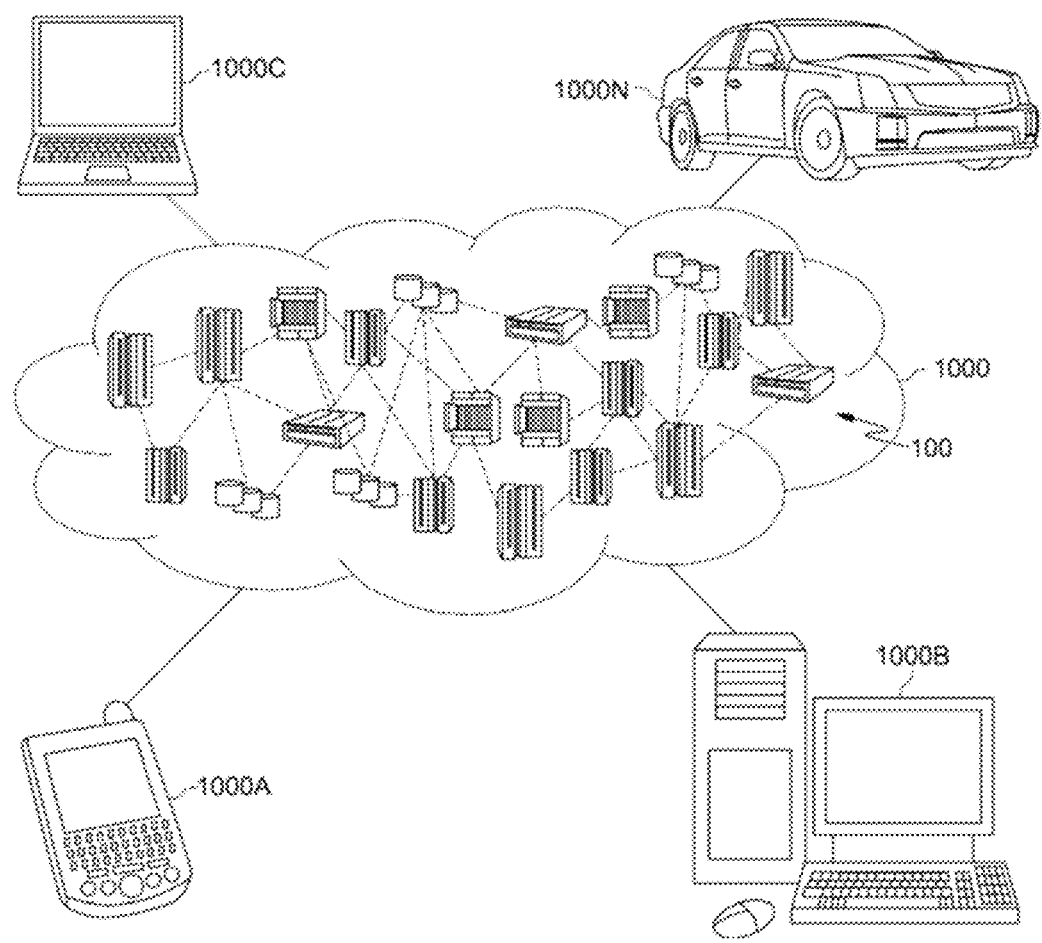
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
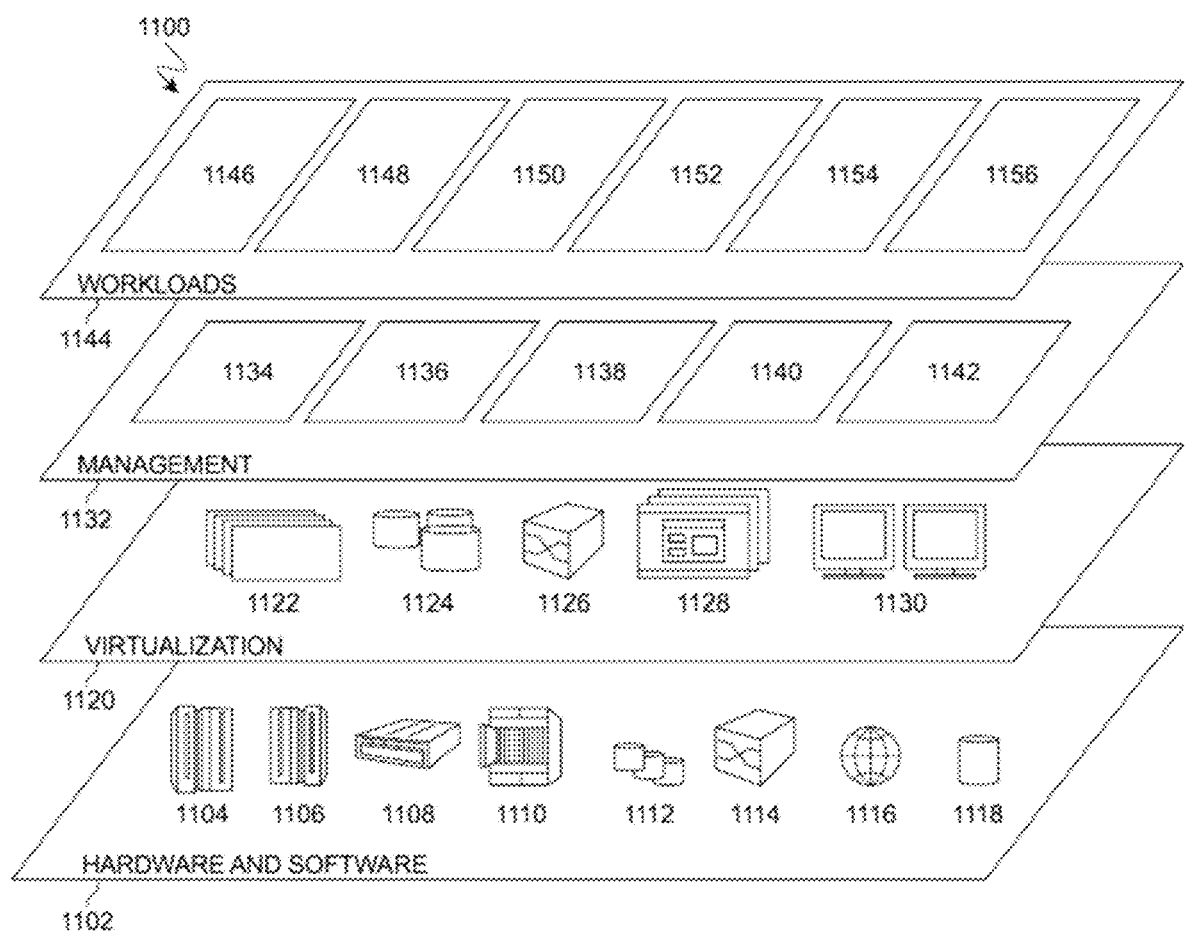
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and personalized content 1156. A personalized content program 110a, 110b provides a way to generate personalized media content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for personalized content, the method comprising:
   monitoring media content from one or more platforms based on user preferences;
   identifying related media content from the one or more platforms, wherein the related media content is filtered based on user interactions with the identified related media content;
   determining one or more pairs of related media content based on a confidence score, wherein each of the one or more pairs of related media content include a question and an answer, and wherein the confidence score associated with the answer is adjusted based on an individual's personality profile;
   assembling the one or more pairs of related media content based on rules of a media content engine, wherein the rules of the media content engine depend at least in part on a form of the or more pairs of related media content; and
   generating personalized media content.

2. The method of claim 1, further comprising:
   determining the confidence score of the answer based on cosine similarity and metadata of the related media content.

3. The method of claim 1, further comprising:
   receiving user feedback based on the personalized media content.

4. The method of claim 3, further comprising:
   training a machine learning model based on the user feedback; and
   utilizing the machine learning model in determining the confidence score of the answer.

5. The method of claim 1, wherein the personalized media content is comprised of a sequence of the one or more pairs of related media content interspliced based on the confidence score of the answer.

6. The method of claim 1, further comprising:
   providing a user with additional media content based on a determined emotional reaction of the user to the personalized media content, wherein the additional media is related to the sequence of the one or more pairs of related media content based on past sequences.

7. A computer system for personalized content, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   monitoring media content from one or more platforms based on user preferences;
   identifying related media content from the one or more platforms, wherein the related media content is filtered based on user interactions with the identified related media content;
   determining one or more pairs of related media content based on a confidence score, wherein each of the one or more pairs of related media content include a question and an answer, and wherein the confidence score associated with the answer is adjusted based on an individual's personality profile;
   assembling the one or more pairs of related media content based on rules of a media content engine, wherein the rules of the media content engine depend at least in part on a form of the or more pairs of related media content; and
   generating personalized media content.

8. The computer system of claim 7, further comprising:
   determining the confidence score of the answer based on cosine similarity and metadata of the related media content.

9. The computer system of claim 7, further comprising:
   receiving user feedback based on the personalized media content.

10. The computer system of claim 9, further comprising:
    training a machine learning model based on the user feedback; and
    utilizing the machine learning model in determining the confidence score of the answer.

11. The computer system of claim 7, The method of claim 1, wherein the personalized media content is comprised of a sequence of the one or more pairs of related media content interspliced based on the confidence score of the answer.

12. The computer system of claim 7, further comprising:
    providing a user with additional media content based on a determined emotional reaction of the user to the personalized media content, wherein the additional media is related to the sequence of the one or more pairs of related media content based on past sequences.

13. A computer program product for personalized content, comprising:
    one or more non-transitory computer-readable storage media and program instructions stored on at least one of the one or more tangible storage media, the program instructions executable by a processor to cause the processor to perform a method comprising:
    monitoring media content from one or more platforms based on user preferences;

identifying related media content from the one or more platforms, wherein the related media content is filtered based on user interactions with the identified related media content;

determining one or more pairs of related media content based on a confidence score, wherein each of the one or more pairs of related media content include a question and an answer, and wherein the confidence score associated with the answer is adjusted based on an individual's personality profile;

assembling the one or more pairs of related media content based on rules of a media content engine, wherein the rules of the media content engine depend at least in part on a form of the or more pairs of related media content; and generating personalized media content.

14. The computer program product of claim 13, further comprising:

determining the confidence score of the answer based on cosine similarity and metadata of the related media content.

15. The computer program product of claim 13, further comprising:

receiving user feedback based on the personalized media content.

16. The computer program product of claim 15, further comprising:

training a machine learning model based on the user feedback; and utilizing the machine learning model in determining the confidence score of the answer.

17. The computer program product of claim 13, wherein the personalized media content is comprised of a sequence of the one or more pairs of related media content interspliced based on the confidence score of the answer.

18. The computer program product of claim 13, further comprising:

providing a user with additional media content based on a determined emotional reaction of the user to the personalized media content, wherein the additional media is related to the sequence of the one or more pairs of related media content based on past sequences.

* * * * *